(12) United States Patent
Fujita

(10) Patent No.: US 7,516,396 B2
(45) Date of Patent: Apr. 7, 2009

(54) SYSTEM, METHOD, AND PROGRAM FOR STRUCTURED DOCUMENT DERIVATION

(75) Inventor: Satoru Fujita, Tokyo (JP)

(73) Assignee: NEC Corporation, Tokyo (JP)

( * ) Notice: Subject to any disclaimer, the term of this patent is extended or adjusted under 35 U.S.C. 154(b) by 604 days.

(21) Appl. No.: 11/090,184

(22) Filed: Mar. 28, 2005

(65) Prior Publication Data

US 2005/0216493 A1    Sep. 29, 2005

(30) Foreign Application Priority Data

Mar. 29, 2004    (JP) ............................. 2004-095257

(51) Int. Cl.
*G06F 17/00*    (2006.01)

(52) U.S. Cl. ...................... 715/200; 715/234

(58) Field of Classification Search ................. 715/500, 715/200, 234, 243

See application file for complete search history.

(56) References Cited

U.S. PATENT DOCUMENTS

| | | | | |
|---|---|---|---|---|
| 5,675,819 | A * | 10/1997 | Schuetze | 704/10 |
| 6,108,676 | A * | 8/2000 | Nakatsuyama | 715/210 |
| 7,231,591 | B2 * | 6/2007 | Fujita | 715/237 |
| 7,296,223 | B2 * | 11/2007 | Chidlovskii et al. | 704/257 |
| 7,343,549 | B2 * | 3/2008 | Ohashi et al. | 715/243 |
| 7,380,207 | B2 * | 5/2008 | Roudot | 715/243 |
| 2003/0041246 | A1 * | 2/2003 | Fischer | 713/178 |
| 2003/0163788 | A1 * | 8/2003 | Dougherty | 715/523 |
| 2004/0167881 | A1 * | 8/2004 | Masuda | 707/3 |
| 2005/0132342 | A1 * | 6/2005 | Van Lunteren | 717/143 |
| 2006/0069985 | A1 * | 3/2006 | Friedman et al. | 715/513 |

FOREIGN PATENT DOCUMENTS

| JP | 2002-342316 A | 11/2002 |
|---|---|---|
| JP | 2003-280942 A | 10/2003 |

OTHER PUBLICATIONS

Ossenbruggen et al., Towards a Multimedia Formatting Vocabulary, ACM May 2003, 384-393.*
Liu et al., An Environment for Maintaining Computation Dependency in XML Documents, ACM Nov. 2005, pp. 42-51.*
Bonifati et al., Building Multi-device, Content-centric Applications Using WebML and the W313 Tool Suite, Google 2000, pp. 64-75.*
Boukottaya et al., Schema Matching for Transforming Structured Documents, ACM 2005, pp. 101-110.*
Bernstein et al., A Scalable System for Identifying Co-derivative Documents, Google 2004, pp. 55-67.*

* cited by examiner

*Primary Examiner*—Cong-Lac Huynh
(74) *Attorney, Agent, or Firm*—Sughrue Mion, PLLC

(57) ABSTRACT

A system, a method, and a program for structured document derivation for generating derived structured documents of different representations having the same contents, facilitating the test for a structured document processor, and avoiding the vulnerability of the structured document processing. A monitor monitors a call from a structured document processing generator to a structured document processor to have a test structured document. A structured document derivation system generates derived structured documents of the test structured document. The derived structured documents are sent to a testing device for testing the structured document processor. A test analyzer determines whether or not each derivative pattern can be accepted. When the processing of a structured document is requested, the test analyzer analyzes the document. When the structured document matches an unacceptable pattern, the document is replaced with an acceptable one.

11 Claims, 18 Drawing Sheets

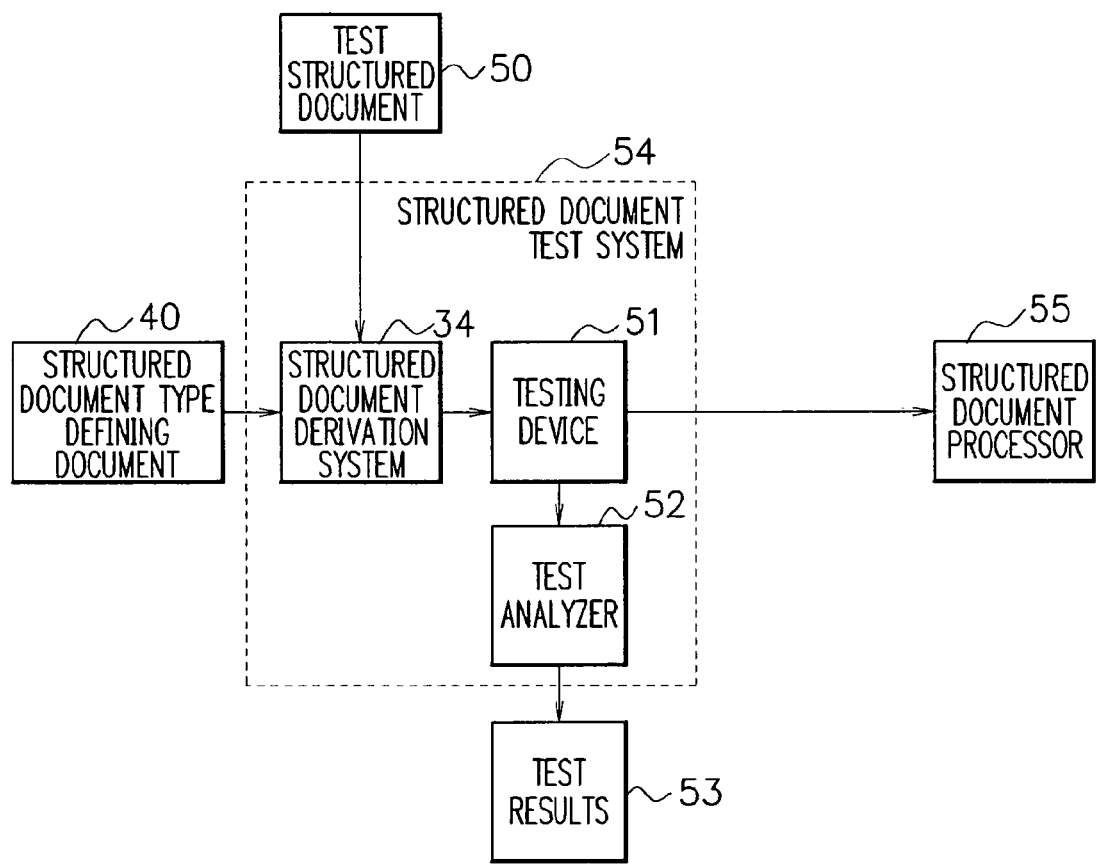
F I G. 6

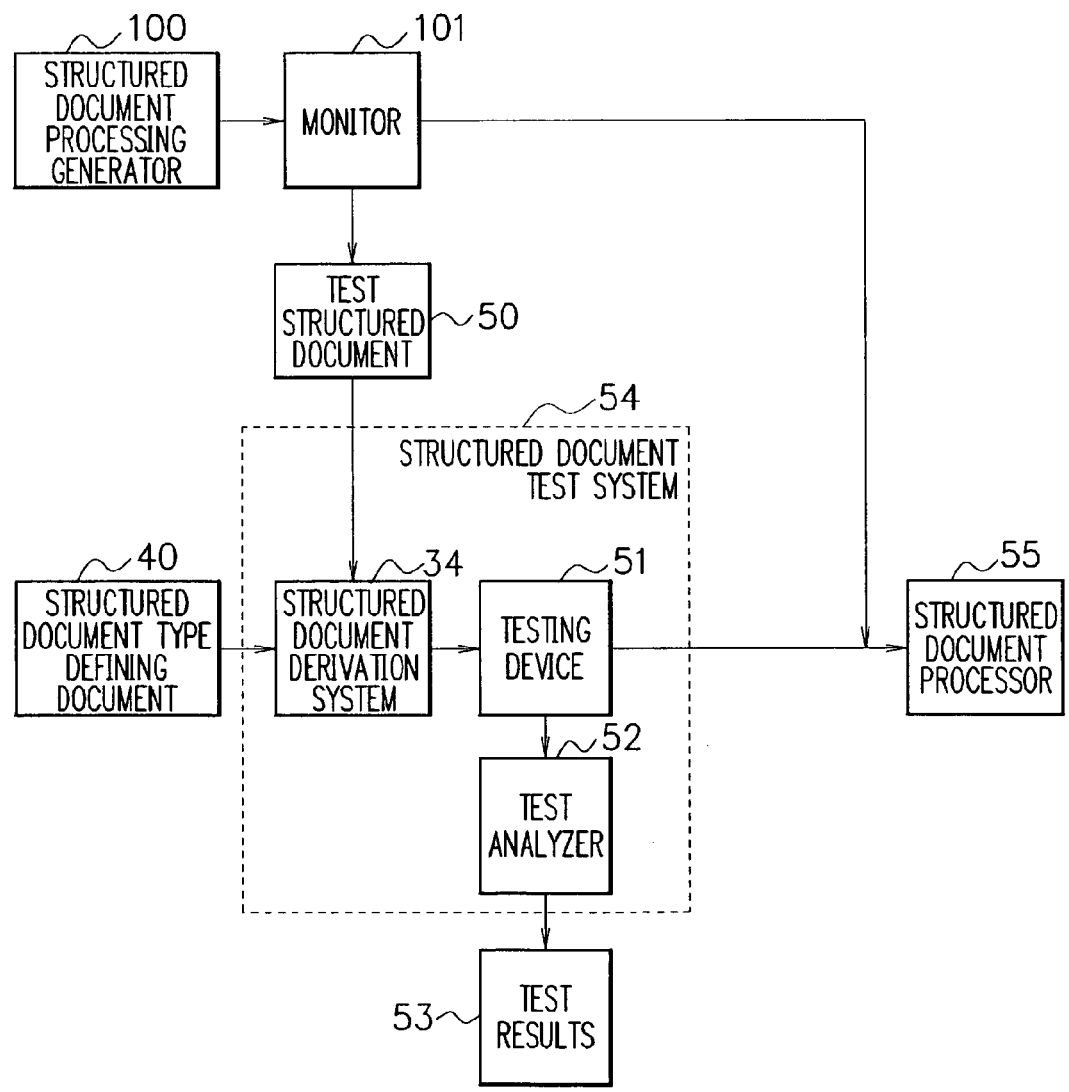
F I G. 9

F I G. 10
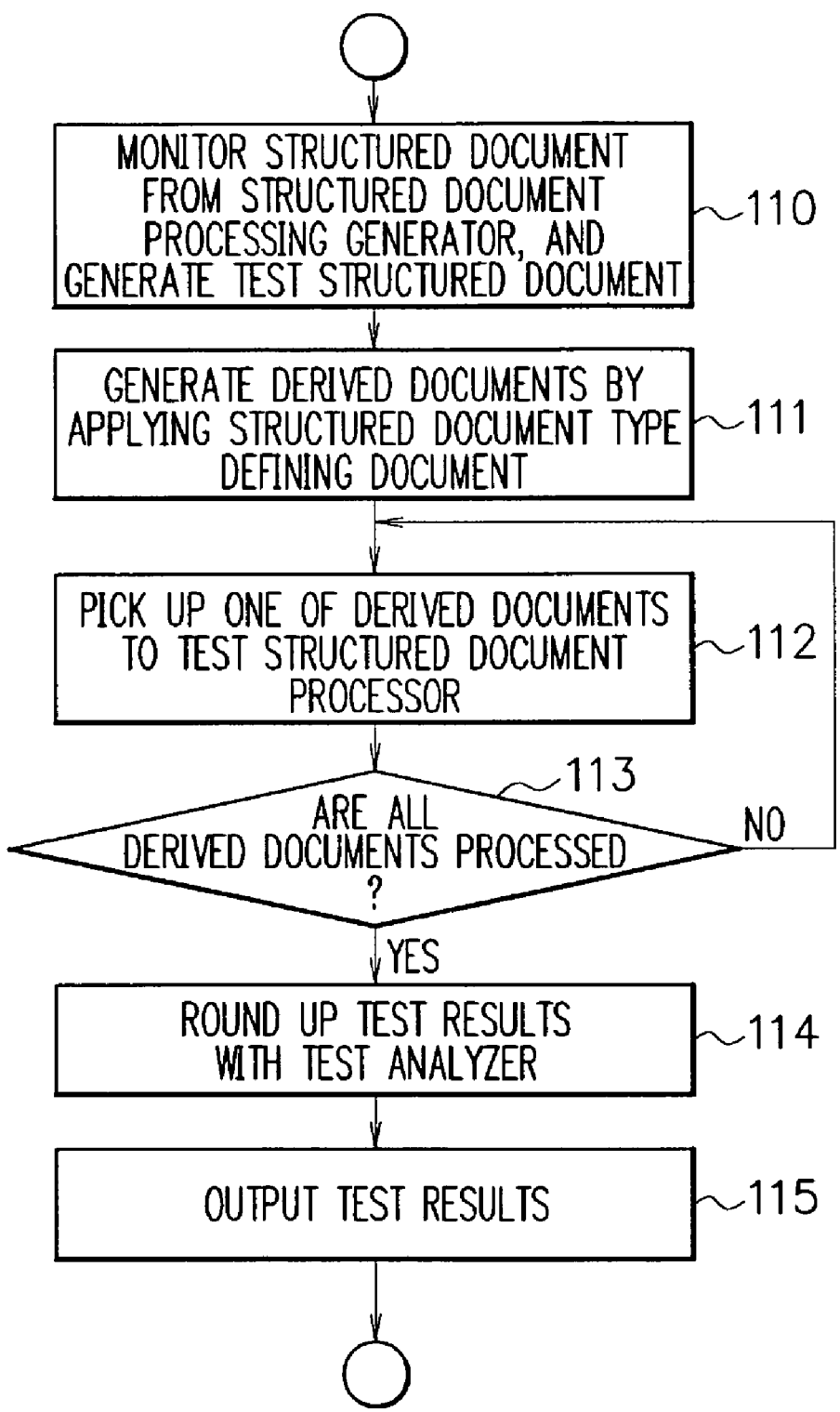

F I G. 11
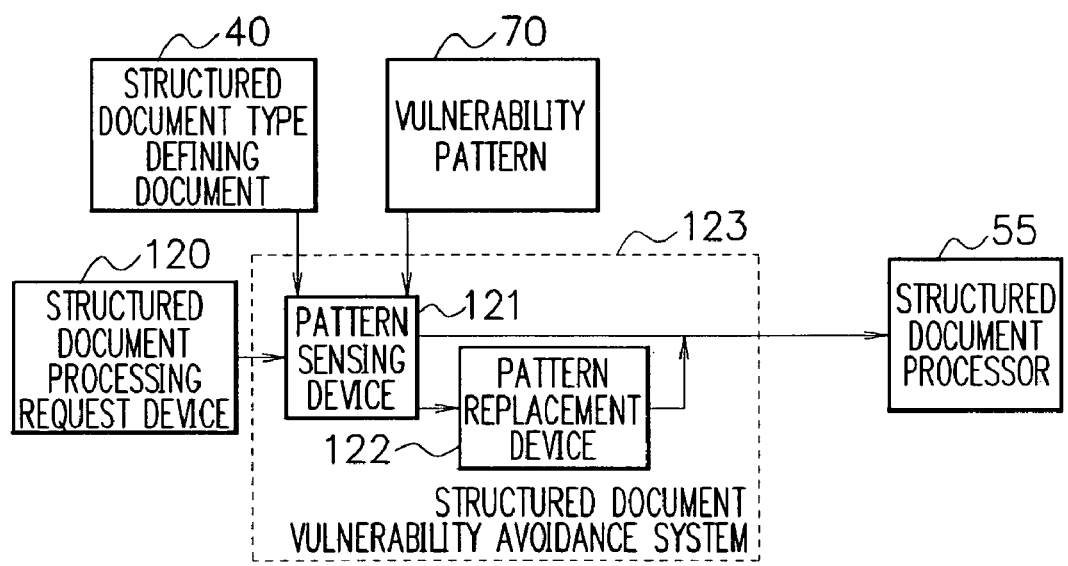

F I G. 15
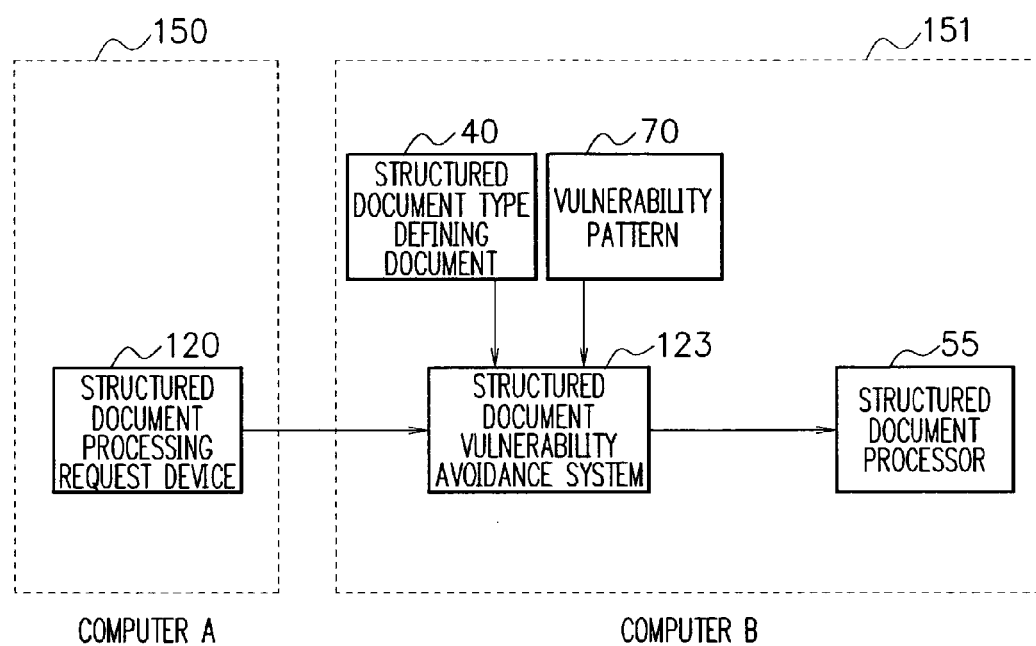

F I G. 17

170 — ```
<prn:name xmlns:prn="http://nec.com/name">
<prn:first> taro </prn:first>
<prn:last> nichiden </prn:last>
</prn:name>
```

171 — ```
<prn:name xmlns:prn="http://nec.com/name">
<prn1:first xmlns:prn1="http://nec.com/name"> taro </prn1:first>
<prn2:last xmlns:prn2="http://nec.com/name"> nichiden </prn2:last>
</prn:name>
```

172 — ```
<name xmlns="http://nec.com/name">
<first> taro </first>
<last> nichiden </last>
</name>
```

173 — ```
<prn:name    xmlns:prn="http://nec.com/name">
<prn:first> taro </prn:first>
<prn:last> nichiden </prn:last>
</prn:name>
```

F I G. 18

```
<?xml version="1.0"?>
<xsd:schema targetNamespace="http://nec.com/name"
            xmlns:xsd="http://www.w3.org/2001/XMLSchema">

<xsd:element name="name">
    <xsd:complexType>
      <xsd:sequence>
        <xsd:element name="first" type="xsd:string"/>
        <xsd:element name="last" type="xsd:string"/>
      </xsd:sequence>
    </xsd:complexType>
  </xsd:element>
</xsd:schema>
```

```
<?xml version="1.0"?>
<features xmlns="http://nec.com/feature">
  <feature target="character-set">
   <option>
     <function>utf-8</function>
     <result>valid</result>
   </option>
   <option>
     <function>utf-16</function>
     <result>invalid</result>
   </option>
  </feature>
  <feature target="namespace">
   <option>
     <function>all-prefixed-namespace</function>
     <result>valid</result>
   </option>
   <option>
     <function>all-default-namespace</function>
     <result>valid</result>
   </option>
   <option>
     <function>mixture-prefix-and-default-namespace</function>
     <result>invalid</result>
   </option>
  </feature>
</features>
```
~80

SYSTEM, METHOD, AND PROGRAM FOR STRUCTURED DOCUMENT DERIVATION

BACKGROUND OF THE INVENTION

1. Field of the Invention

The present invention relates to a system, a method and a program for structured document derivation for converting a structured document from one representation to another without changing the contents of the document.

2. Description of the Prior Art

An example of a conventional structured document test generating system is disclosed in Japanese Patent Application laid open No. 2003-280942. FIG. 1 is a block diagram showing the conventional structured document test generating system. As shown in FIG. 1, the conventional structured document test generating system comprises a structured document type defining document inputting section 11, a structured document type defining document analyzer 12 and a test program generator 13. Such conventional structured document test generating system operates as follows. A structured document type defining document 10 such as DTD (Document Type Definition) is input to the structured document type defining document inputting section 11 to be analyzed in the structured document type defining document analyzer 12. Based on the analysis result, the test program generator 13 generates a test program 15 of the structured document.

Further, Japanese Patent Application laid open No. 2002-342316 discloses an example of a conventional structured document conversion system. FIG. 2 is a block diagram showing the conventional structured document conversion system. As shown in FIG. 2, the conventional structured document conversion system comprises a structured document type conversion defining document inputting section 22, a structured document inputting section 23 and a structured document converter 24. Such conventional structured document conversion system operates as follows. A structured document type conversion defining document 21 is input to the structured document type conversion defining document inputting section 22. According to the rule of the input document, the structured document converter 24 converts the structure of a structured document 20 input from the structured document inputting section 23 to output a purposive form structured document 25 different from the input structured document 20.

The first problem is that the structured document conversion system has not generated structured documents of different representations having the same contents. With a structured document, because it is possible to have the same data in common among a plurality of systems, systems for document structure conversion have been highly developed for accepting the difference among document structures in the systems. On the other hand, it has not been conceived to convert a structured document to derivatives in different representations having the same contents. Incidentally, "structured documents of different representations having the same contents" indicate structured documents the same in structure and information therein and different in output representation such as name of namespace, space for indentation, or character code.

The second problem is that the structured document test generating system has focused on generating, by using a structured document type defining document, a structured document meeting the definition to accept it, and has not allowed enough for the variation of representations of a structured document. In a conventional test generating system, while the conversion of contents and structure of input data is an important test item, it has never been thought about whether or not structured documents generally showing a diversity in representation of the same contents of data are all acceptable.

The third problem is that structured document processing systems have not worked together for automatically avoiding structured documents having a vulnerable pattern by inputting test results indicating the diversity of representation of a structured document to a system for automatically compensating weakness in the performance of the systems. This is because there has been neither a system focusing on the diversity of representation of a structured document nor consideration for the use of the test results as to the diversity of representation for automatically compensating weakness in the performance of the systems in runtime.

The fourth problem is that a system has not invented for improving the quality of processes of a structured document processing system by providing an intermediate node. The intermediate node has been considered to mainly perform logging, routing and representation conversion and the use of the intermediate node has not been considered to improve the end service without changing data contents.

SUMMARY OF THE INVENTION

It is therefore the first object of the present invention to provide a structured document derivation system in which structured documents of different representations having the same contents can be derived from a structured document.

The second object is to provide a structured document test system for testing whether or not a system can accept structured documents of various representations having the same contents derived from a structured document.

The third object is to provide a structured document vulnerability avoidance system capable of avoiding vulnerability of processing ability in runtime by applying the result obtained by the structured document test system for various representations.

The fourth object is to provide a quality improvement system applying, as an intermediate node for relaying a structured document, the structured document vulnerability avoidance system capable of avoiding vulnerability of processing ability without changing the data contents of the structured document.

A structured document derivation system of the present invention comprises a structured document inputting section, a structured document derivative generator, and derivation functions, in which, by applying the derivation functions, a plurality of derivatives of different representations having the same contents are generated. By virtue of this construction, derivatives are generated from a structured document. Thus, it is possible to achieve the first object.

A structured document test system of the present invention comprises a structured document derivation system, a testing device, and a test analyzer, in which, from an input test structured document, a plurality of derivatives are generated and input to a structured document processor to test them, and the results are analyzed. By virtue of this construction, the structured document processor is tested, and therefore it is possible to achieve the second object.

A structured document vulnerability avoidance system of the present invention comprises a pattern sensing device and a pattern replacement device, in which a pattern for vulnerability is detected from an input from a structured document processing request device, and according to a vulnerability pattern and a structured document type defining document received, when the pattern matches the vulnerability pattern, the pattern is replaced by a pattern which does not fit the vulnerability pattern. By virtue of this construction, vulnerability of a structured document is avoided. Thus it is possible to achieve the third object.

A quality improvement system provided with the structured document vulnerability avoidance system of the present invention as an intermediate node comprises a structured document type defining document, a vulnerability pattern and the structured document vulnerability avoidance system on a computer of another intermediate node where a structured document processor is not placed, wherein vulnerability of the structured document processor is avoided by the intermediate node. By virtue of this construction, a structured document processor is improved in quality from the outside. Thus it is possible to achieve the fourth object.

According to the first aspect of the present invention, there is provided a structured document derivation system for generating derivatives of different representations without changing the contents.

According to the second aspect of the present invention, there is provided a structured document test system for testing a structured document processing system, wherein derived structured documents of various representations having the same contents are generated and tested.

According to the third aspect of the present invention, there is provided a structured document vulnerability avoidance system being an intermediate system for processing a structured document, having information on the vulnerability pattern of derivatives of a structured document for a structured document processing system, wherein a structured document in a pattern that matches the vulnerability pattern is replaced by a derivative acceptable to the structured document processing system to be fed to the structured document processing system.

According to the fourth aspect of the present invention, there is provided a structured document derivation system comprising an inputting section for accepting an input of a structured document, derivation functions for converting the representation of the structured document without changing the contents of the structured document, a structured document derivative generator for generating a plurality of derived structured documents of different representations without changing the contents of the structured document by using the input structured document and the derivation functions.

According to the fifth aspect of the present invention, in the fourth aspect, the structured document derivation system further comprises a structured document type defining document inputting section for accepting an input of a structured document type defining document, wherein the structured document derivative generator generates derived structured documents based on information from the structured document type defining document.

According to the sixth aspect of the present invention, there is provided a structured document test system comprising the structured document derivation system in the fourth-or fifth aspect, a testing device for testing a structured document processor by applying derived structured documents generated by the structured document derivation system, and a test analyzer for analyzing test results obtained by the testing device to output the test results.

According to the seventh aspect of the present invention, in the sixth aspect, in the structured document test system, the test analyzer further outputs, in addition to the test results, information on a vulnerability pattern which can not be processed by the structured document processor.

According to the eighth aspect of the present invention, in the sixth or seventh aspect, the structured document test system further comprises a display for displaying the test results.

According to the ninth aspect of the present invention in one of the sixth to eighth aspects, the structured document test system further comprises a monitor for monitoring a processing request to the structured document processor from a structured document processing generator to have a test structured document, wherein based on the test structured document obtained from the monitor, derived structured documents are generated and the structured document processor is tested.

According to the tenth aspect of the present invention, there is provided a structured document vulnerability avoidance system comprising a structured document processing request device for requesting the structured document processor to perform structured document processing, a pattern sensing device for inputting a vulnerability pattern and determining whether or not the structured document processing request includes the processing of a structured document that matches the vulnerability pattern, and a pattern replacement device for replacing the structured document with one in a representation that does not match the vulnerability pattern in the case that the pattern sensing device has determined that the pattern of the structured document matches the vulnerability pattern.

According to the eleventh aspect of the present invention, in the tenth aspect, the structured document vulnerability avoidance system further comprises a structured document test system to have the vulnerability pattern to be utilized, wherein the vulnerability of the structured document processor can be avoided in cooperation with results obtained by the structured document test system.

According to the twelfth aspect of the present invention, in the tenth aspect, the structured document vulnerability avoidance system further comprises a monitor for monitoring the structured document processing request to the structured document processor, and a structured document test system for testing the structured document processor by generating derived structured documents based on a test structured document from the monitor, wherein, based on the test structured document from the monitor, the derived structured documents are generated to test the structured document processor, and the vulnerability pattern obtained as the test results is applied for avoiding vulnerability of the structured document processor.

According to the thirteenth aspect of the present invention, there is provided a quality improvement system for the structured document processor, wherein the structured document vulnerability avoidance system in one of the tenth to twelfth aspects is placed on the same computer where the structured document processor is placed so that the structured document processor is not accessed directly from the outside but via the structured document vulnerability avoidance system to build a structured document processing system not including vulnerability.

According to the fourteenth aspect of the present invention, there is provided a quality improvement system for the structured document processor, wherein the structured document vulnerability avoidance system in one of the tenth to twelfth aspects is placed on a second computer different from a first computer on which the structured document processor is placed, and the structured document vulnerability avoidance system on the second computer avoids vulnerability of the structured document processor on the first computer.

According to the fifteenth aspect of the present invention, there is provided a structured document derivation method comprising the steps of registering derivation functions capable of converting representation without changing the contents of a structured document, accepting an input of a structured document, and generating a plurality of derived structured documents in various representations without changing the contents.

According to the sixteenth aspect of the present invention, there is provided a structured document derivation method comprising the steps of registering derivation functions capable of converting representation without changing the contents of a structured document, registering a structured document type defining document for a structured document, accepting an input of a structured document, and generating a plurality of derived structured documents of different representations without changing the contents.

According to the seventeenth aspect of the present invention, there is provided a structured document test method comprising the steps of testing a structured document processor applying the derived structured documents generated by the structured document derivation method in the fifteenth or sixteenth aspect, analyzing the results of the test, and outputting the results.

According to the eighteenth aspect of the present invention, in the seventeenth aspect, the structured document test method further comprises the step of outputting information on a vulnerability pattern which cannot be processed by the structured document processor.

According to the nineteenth aspect of the present invention, in the seventeenth or eighteenth aspect, the test method further comprises the step of displaying the test results.

According to the twentieth aspect of the present invention, in one of the seventeenth to nineteenth aspects, the structured document test method further comprises the steps of monitoring a processing request from a structured document processing generator to the structured document processor, and accepting a structured document obtained through the monitoring as an input.

According to the twenty-first aspect of the present invention, there is provided a structured document vulnerability avoiding method comprising the steps of registering a vulnerability pattern, inputting a structured document processing request to a structured document processor, determining whether or not the structured document processing request includes the processing of a structured document in a pattern that matches the vulnerability pattern, and when the structured document has been determined to match the vulnerability pattern, replacing the representation of the structured document with one that does not match the vulnerability pattern.

According to the twenty-second aspect of the present invention, in the twenty-first aspect, the structured document vulnerability avoiding method further comprises the steps of testing the structured document processor by the structured document test method, and avoiding the vulnerability by applying the vulnerability pattern obtained as the test results.

According to the twenty-third aspect of the present invention, in the twenty-first aspect, the structured document vulnerability avoiding method further comprises the steps of monitoring the structured document processing request to the structured document processor, testing the structured document processor by using the results of the monitoring according to the structured document test method, and avoiding vulnerability applying a vulnerability pattern obtained as the test results.

According to the twenty-fourth aspect of the present invention, there is provided a program for making a computer to perform the processes of registering derivation functions capable of converting representation without changing the contents of a structured document, accepting an input of a structured document, and generating a plurality of derived structured documents in different representations without changing the contents.

According to the twenty-fifth aspect of the present invention, there is provided a program for making a computer to perform the processes of registering derivation functions capable of converting representation without changing the contents of a structured document, registering a structured document type defining document of a structured document, accepting an input of a structured document, and generating a plurality of derived structured documents in various representations without changing the contents.

According to the twenty-sixth aspect of the present invention, in the twenty-fourth or twenty-fifth aspect, the program further makes a computer to perform the processes of testing a structured document processor applying the derived structured documents generated by the structured document derivation method, analyzing the results of the test, and outputting the results.

According to the twenty-seventh aspect of the present invention, in the twenty-sixth aspect, the program further makes a computer to perform the process of outputting information on a vulnerability pattern which cannot be processed by the structured document processor.

According to the twenty-eighth aspect of the present invention, in the twenty-sixth or twenty-seventh aspect, the program further makes a computer to perform the process of displaying the test results.

According to the twenty-ninth aspect of the present invention, in one of the twenty-sixth to twenty-eighth aspects, the program further makes a computer to perform the processes of monitoring a processing request from a structured document processing generator to the structured document processor, and inputting a structured document obtained through the monitoring to the program.

According to the thirtieth aspect of the present invention, there is provided a program for making a computer to perform the processes of registering a vulnerability pattern, inputting a structured document processing request to a structured document processor, determining whether or not the structured document processing request includes the processing of a structured document that matches the vulnerability pattern, and when the structured document has been determined to match the vulnerability pattern, replacing the representation of the structured document with one that does not match the vulnerability pattern.

According to the thirty-first aspect of the present invention, in the thirtieth aspect, the program further makes a computer to perform the processes of testing the structured document processor by the structured document test method, and inputting a vulnerability pattern obtained as the test results to the program.

According to the thirty-second aspect of the present invention, in the thirtieth aspect, the program further makes a computer to perform the processes of monitoring the structured document processing request to the structured document processor, testing the structured document processor by using the results of the monitoring according to the structured document test method, and inputting a vulnerability pattern obtained as the test results to the program.

BRIEF DESCRIPTION OF THE DRAWINGS

The above and further objects and novel features of the invention will be more fully understood from the following detailed description when the same is read in connection with the accompanying drawings in which:

FIG. 6 is a block diagram showing the structure of a structured document test system according to the third embodiment;

FIG. 9 is a block diagram illustrating the sixth embodiment of the present invention;

FIG. 10 is a flowchart showing the operation of the sixth embodiment;

FIG. 11 is a block diagram showing the structure of a structured document vulnerability avoidance system according to the seventh embodiment;

FIG. 15 is a block diagram showing the structure of a structured document processor quality improvement system according to the tenth embodiment;

FIG. 17 is a diagram for explaining a concrete example of structured documents according to the first embodiment;

FIG. 18 is a diagram for explaining a concrete example of the operation according to the second embodiment; and FIG. 19 is a diagram for explaining a concrete example of the operation according to the fourth embodiment.

DETAILED DESCRIPTION OF THE PREFERRED EMBODIMENTS

A detailed description will be given of the preferred embodiments of the present invention with reference to the accompanying drawings.

Figure 1:
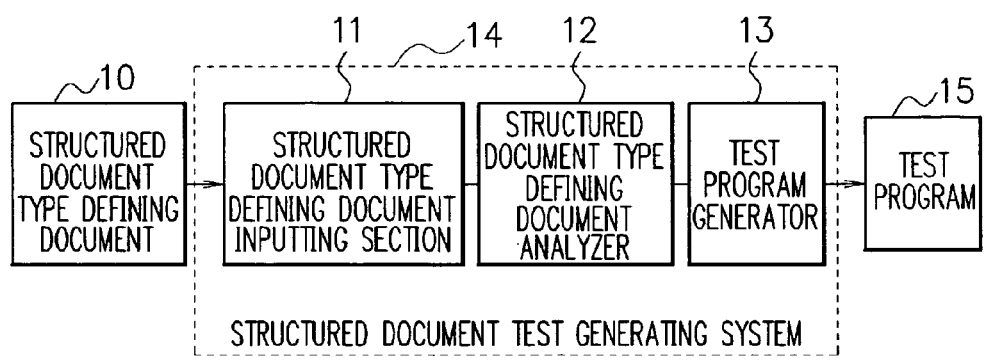
FIG. 1 is a block diagram showing a conventional structured document test generating system.
Figure 2:
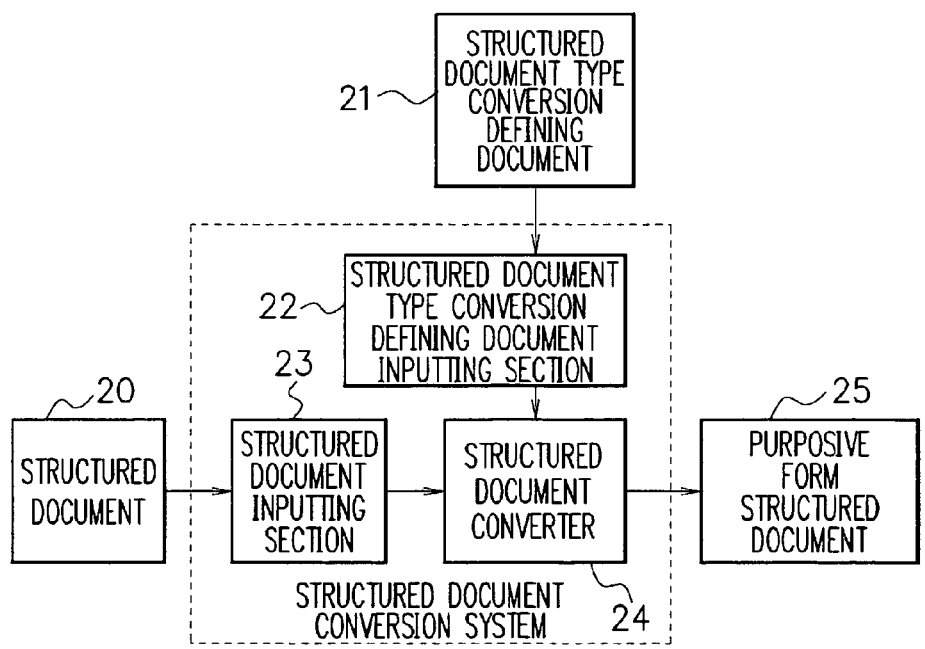
FIG. 2 is a block diagram showing a conventional structured document conversion system.
Figure 3:
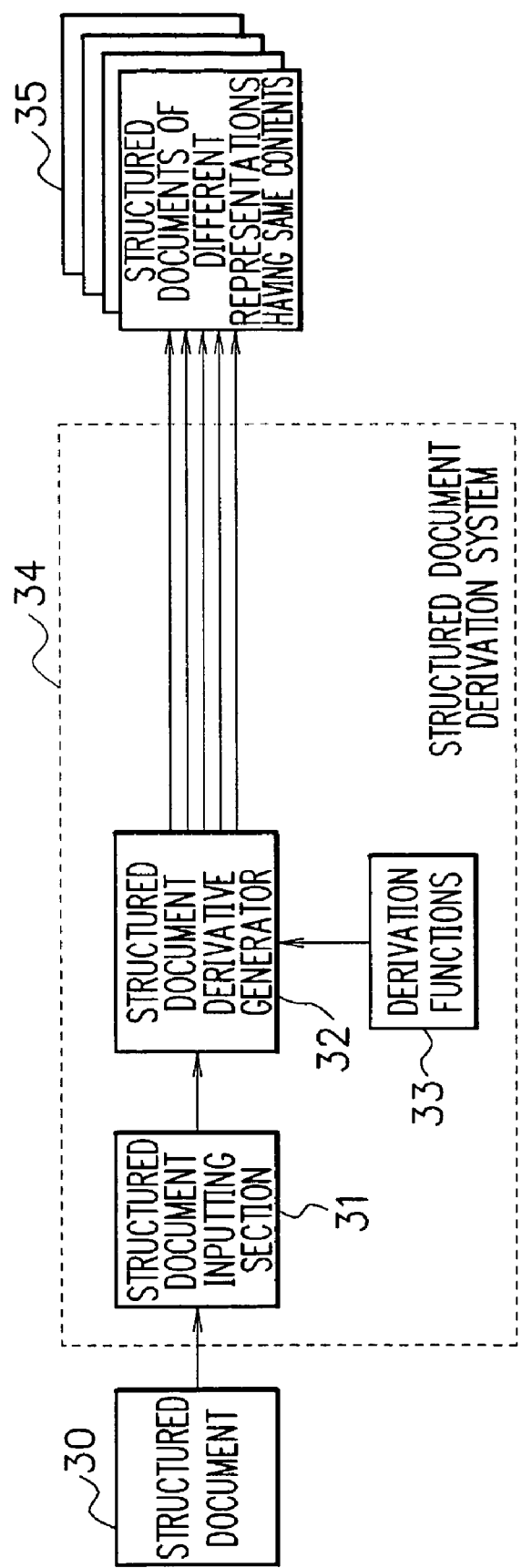
FIG. 3 is a block diagram showing the structure of a structured document derivation system according to the first embodiment.

FIG. 3 is a block diagram showing the structure of a structured document derivation system according to the first embodiment. Referring to FIG. 3, a structured document derivation system 34 comprises a structured document inputting section 31 to which a structured document 30 is input, a structured document derivative generator 32 for generating derivatives of the structured document 30, and derivation functions 33 for providing the structured document derivative generator 32 with functions for derivation.

The structured document inputting section 31 accepts the input of the structured document 30 from the outside and converts the document 30 to the system's internal representation to send it to the structured document derivative generator 32. The structured document derivative generator 32 converts the structured document 30 in the internal representation received from the structured document inputting section 31 by the derivation functions 33 to output structured documents of different representations having the same contents 35. The structured document derivation system 34 comprising the structured document inputting section 31, the structured document derivative generator 32, and the derivation functions 33, as a whole, receives the structured document 30 as an input and outputs the structured documents of different representations having the same contents 35.

Figure 4:
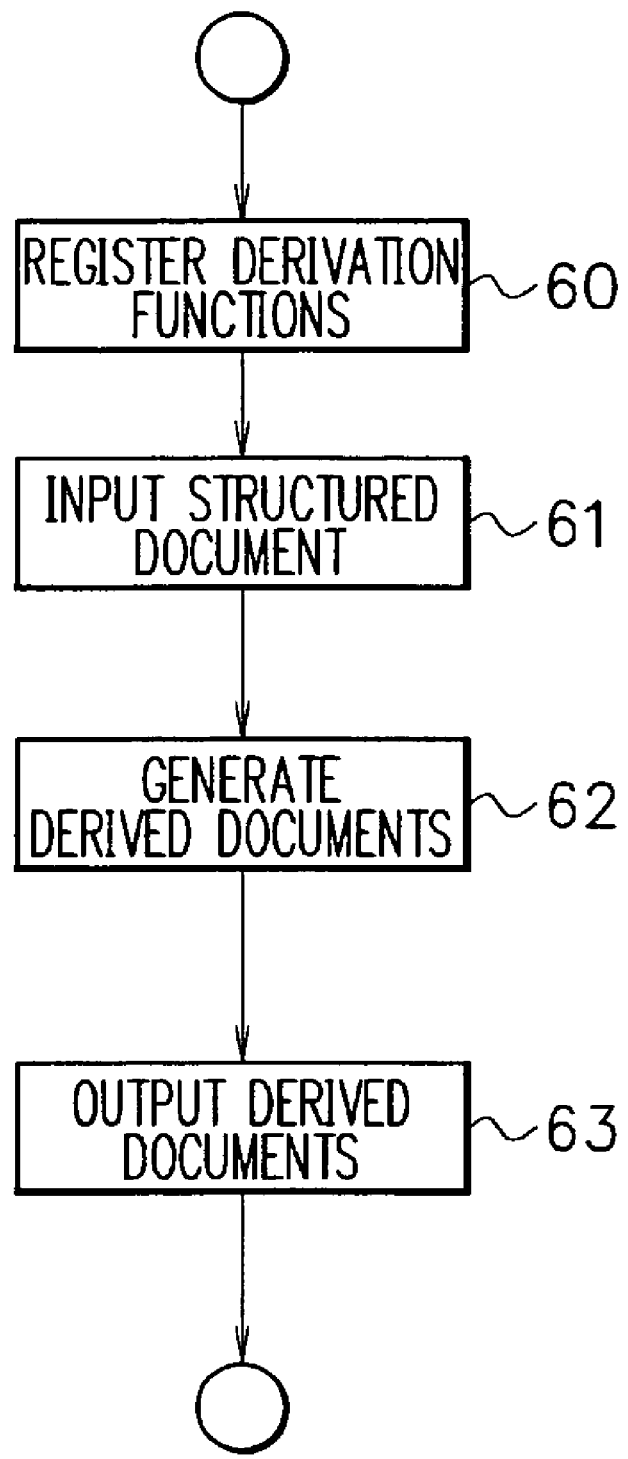
FIG. 4 is a flowchart showing the operation of the structured document derivation system of the first embodiment.

Next, a detailed description will be given of the operation of this embodiment with reference to a flowchart of FIG. 4. The derivation functions 33 are registered in advance (step 60). The structured document 30 is input to be converted to the system's internal representation by the structured document inputting section 31 (step 61). The structured document derivative generator 32 receives the structured document in the system's internal representation as an input and generates derivatives of the structured document 30 (step 62). The structured document derivative generator 32 outputs the structured documents of different representations having the same contents 35 (step 63).

As described above, in this embodiment, the derivation functions 33 can be registered. Therefore, derivatives of the structured document 30 in various representations can be generated according to the features of the registered derivation functions 33. Different derivatives can be generated by adding or replacing the derivation functions 33. Further, more derivatives can be generated by the combination of the derivation functions 33.

A Detailed Description will be Given of the Second Embodiment

Figure 5:
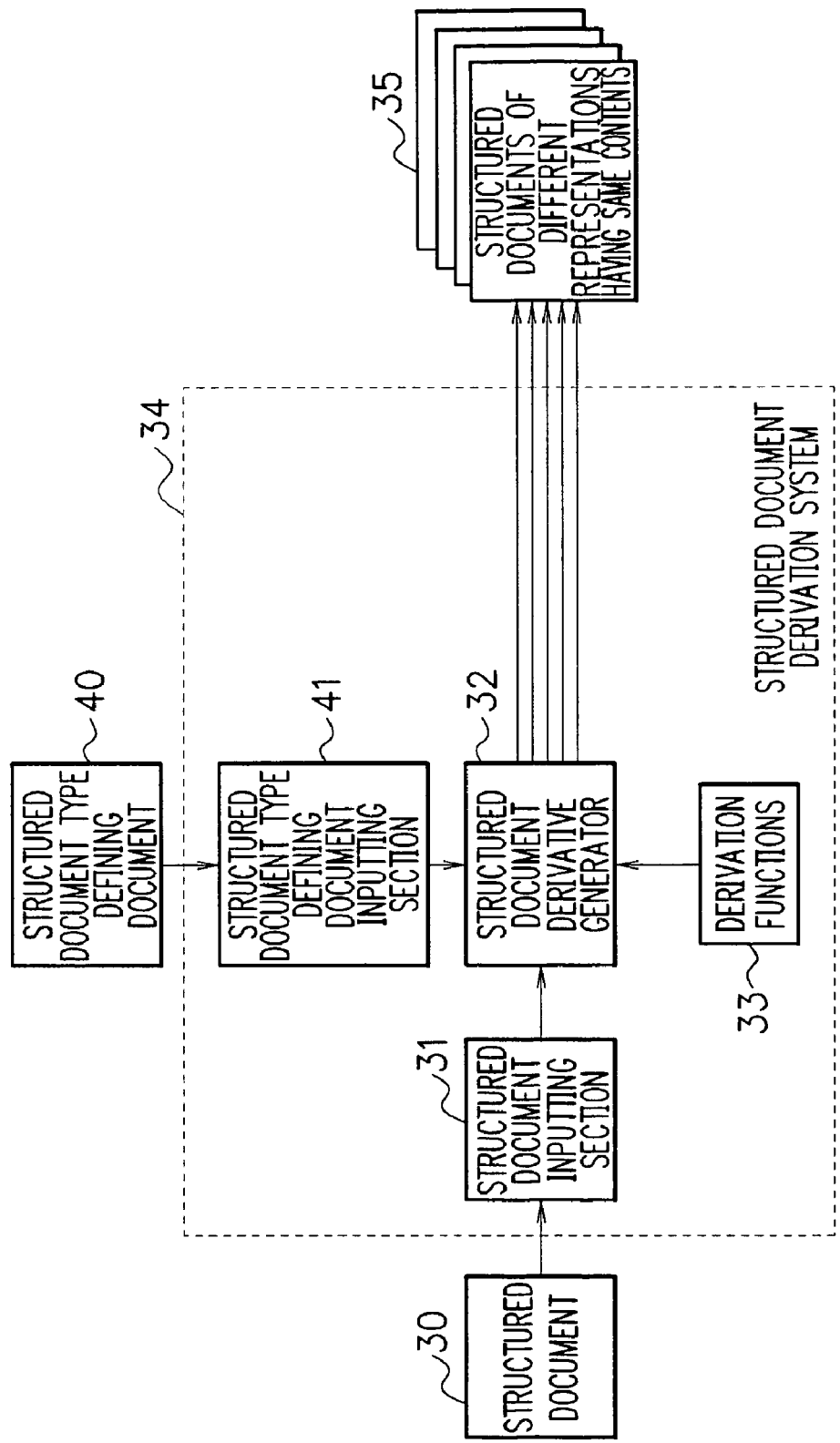
FIG. 5 is a block diagram showing the structure of a structured document derivation system according to the second embodiment.

FIG. 5 is a block diagram showing the structure of a structured document derivation system according to the second embodiment. Incidentally, like reference numerals refer to corresponding parts throughout the drawings.

Referring to FIG. 5, the structured document derivation system 34 comprises the structured document inputting section 31 to which the structured document 30 is input, a structured document type defining document inputting section 41 to which a structured document type defining document 40 is input, the structured document derivative generator 32 for generating derivatives of the structured document 30, and the derivation functions 33 for providing the structured document derivative generator 32 with functions for derivation.

The structured document inputting section 31 accepts an input of the structured document 30 from the outside and converts the document 30 to the system's internal representation to send it to the structured document derivative generator 32. The structured document type defining document inputting section 41 accepts an input of the structured document type defining document 40 from the outside to feed it to the structured document derivative generator 32. The structured document derivative generator 32 converts the structured document in the system's internal representation received from the structured document inputting section 31 by the derivation functions 33 referring to the structured document type defining document 40 to output structured documents of different representations having the same contents 35. The structured document derivation system 34 comprising the structured document inputting section 31, the structured document derivative generator 32, the derivation functions 33, and the structured document type defining document inputting section 41, as a whole, receives the structured document 30 and the structured document type defining document 40 as inputs, and outputs the structured documents of different representations having the same contents 35.

In this embodiment, because the structured document type defining document 40 is accepted as an input, more type information on derivatives of the structured document 30 in various representations can be generated according to more information on the type of the document 30 and the derivation functions 33.

A Detailed Description will be Given of the Third Embodiment

FIG. 6 is a block diagram showing the structure of a structured document test system according to the third embodiment. Referring to FIG. 6, a structured document test system 54 comprises the structured document derivation system 34 for accepting an input of a test structured document 50 and an input of the structured document type defining document 40 as an option to generate derived structured documents, a testing device 51 for testing a structured document processor 55 using the derived structured documents output from the structured document derivation system 34, and a test analyzer 52 for analyzing the test results obtained by the testing device 51.

The structured document derivation system 34 accepts an input of the test structured document 50 from the outside to generate derivatives of the test structured document 50 and feeds them to the testing device 51. The testing device 51 sends the derivatives to the structured document processor 55 to monitor whether or not the derivatives are received properly and a proper answers are returned. The test results are fed to the test analyzer 52 and analyzed to be output as test results 53.

In the third embodiment, by the input of the test structured document 50, the structured document derivation system 34 generates many structured documents of different representations having the same contents to input them to the testing device 51 for testing the structured document processor 55. Therefore, it is possible to perform exhaustive test for representations of the structured document.

A Detailed Description will be Given of the Fourth Embodiment

Figure 7:
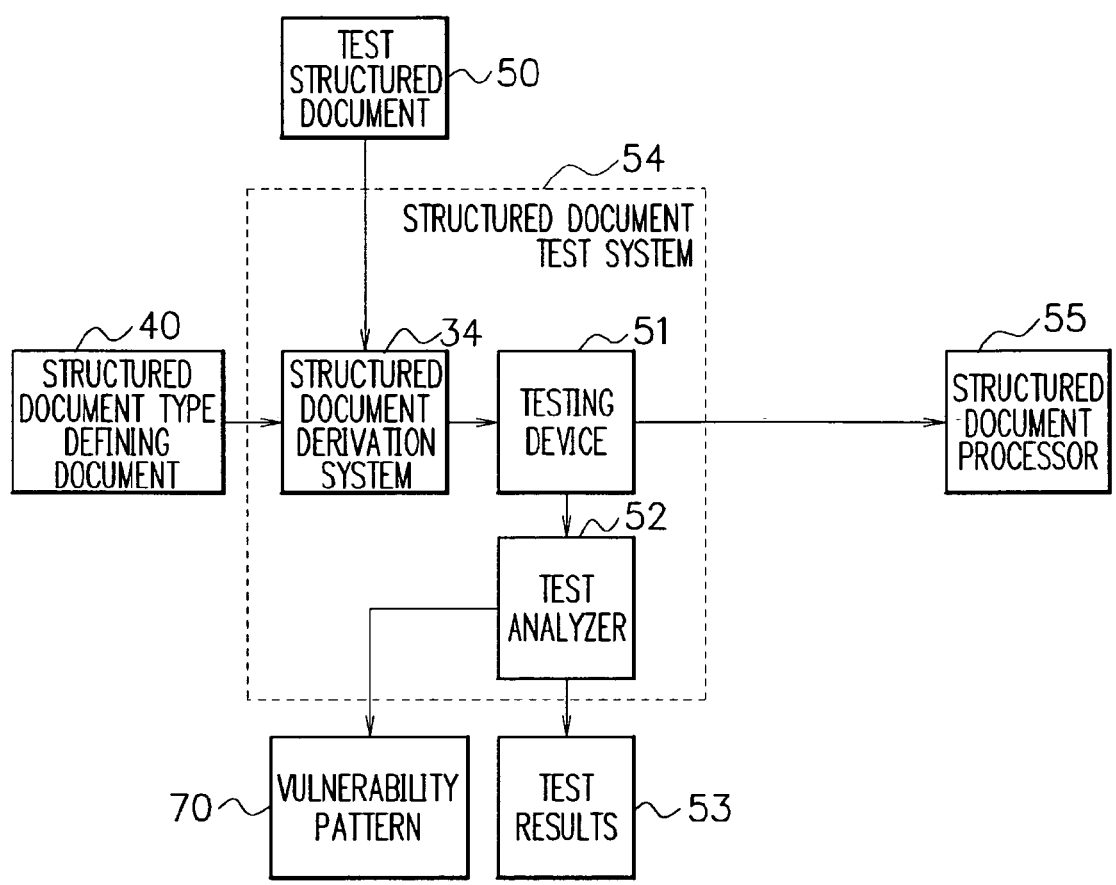
FIG. 7 is a block diagram showing the structure of a structured document test system according to the fourth embodiment.

FIG. 7 is a block diagram showing the structure of a structured document test system according to the fourth embodiment. Referring to FIG. 7, the structured document test system 54 comprises the structured document derivation system 34 for accepting inputs of the test structured document 50 and the structured document type defining document 40 to generate derivatives of the structured document, the testing device 51 for testing the structured document processor 55 by applying the derivatives output from the structured document derivation system 34, the test analyzer 52 for analyzing the results obtained by the testing device 51. The test analyzer 52 outputs a vulnerability pattern 70 indicating the vulnerability of the structured document processor 55 with respect to the acceptability of structured documents as well as the test results 53.

The structured document derivation system 34 accepts inputs of the test structured document 50 and the structured document type defining document 40 from the outside to generate derivatives of the test structured document 50, and feeds them to the testing device 51. The testing device 51 sends the derivatives to the structured document processor 55, and monitors whether or not the derivatives are received properly and proper answers are returned. The test results are fed to the test analyzer 52. The test analyzer analyzes the test results and outputs the test results 53 and the vulnerability pattern 70.

In the fourth embodiment, from the test analyzer 52, the test results 53 and the vulnerability pattern 70 are output. The vulnerability pattern 70 is data indicating an representation of a structured document, which could not be accepted by the structured document processor 55, and can be applied to the construction of other systems using the data.

A Detailed Description will be Given of the Fifth Embodiment

Figure 8:
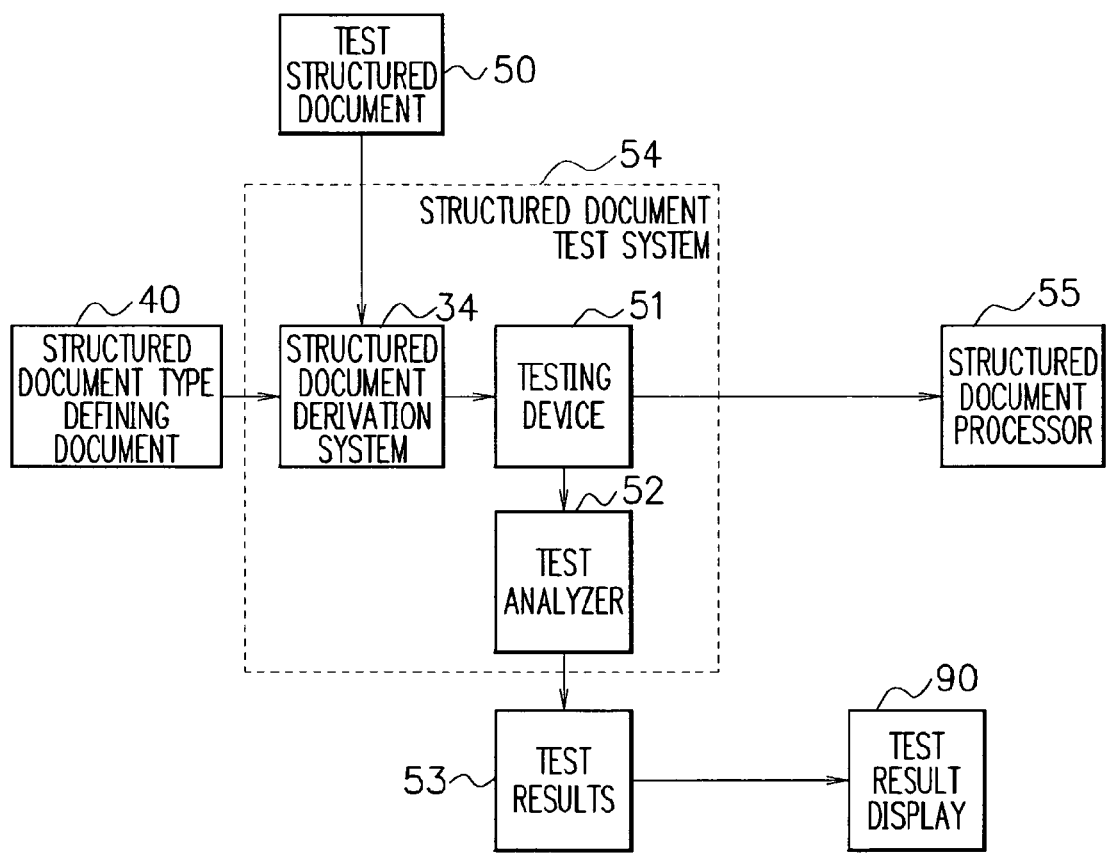
FIG. 8 is a block diagram showing the structure of a structured document test system according to the fifth embodiment.

FIG. 8 is a block diagram showing the structure of a structured document test system according to the fifth embodiment. Referring to FIG. 8 illustrating the fifth embodiment, there are shown the structured document test system 54 and a test results display 90. The structured document test system 54 comprises the structured document derivation system 34 for accepting an input of the test structured document 50 and the structured document type defining document 40 to generate derivatives of the structured document, the testing device 51 for testing the structured document processor 55 by applying the derivatives output from the structured document derivation system 34, the test analyzer 52 for analyzing the results from the testing device 51.

The structured document derivation system 34 accepts an input of the test structured document 50 and optionally accepts an input of the structured document type defining document 40 from the outside to generate derivatives of the test structured document 50 and feeds them to the testing device 51. The testing device 51 sends the derivatives to the structured document processor 55, and monitors whether or not the derivatives are received properly and proper answers are returned. The test results are fed to the test analyzer 52 and analyzed to be output as the test results 53. The test results 53 are displayed on the test result display 90 such as a computer display or the like.

In the fifth embodiment, the test results 53 being an output from the structured document test system 54 can be displayed on the test result display 90. Therefore, the test results 53 can be checked easily.

A Detailed Description will be Given of the Sixth Embodiment

FIG. 9 is a block diagram showing the sixth embodiment of the present invention. Referring to FIG. 9 illustrating the sixth embodiment, there are shown a monitor 101 for monitoring a processing request from a structured document processing generator 100 to the structured document processor 55, and the structured document test system 54. The structured document test system 54 comprises the structured document derivation system 34 for accepting inputs of the test structured document 50 monitored by the monitor 101 and the structured document type defining document 40 to generate derivatives of the structured document, the testing device 51 for testing the structured document processor 55 by applying the derivatives output from the structured document derivation system 34, and the test analyzer 52 for analyzing the test results from the testing device 51.

The structured document processing generator 100 sends a processing request to the structured document processor 55. The monitor 101 monitors the processing request to create the test structured document 50. The structured document derivation system 34 inputs the test structured document 50 and the structured document type defining document 40 from the outside to generate derivatives of the test structured document 50, and feeds them to the testing device 51. The testing device 51 sends the derivatives to the structured document processor 55, and monitors whether or not the derivatives are properly accepted and proper answers are returned. The test results are fed to the test analyzer 52 to be analyzed and output as the test results 53.

In other words, a call or a processing request issued from the structured document processing generator 100 to the structured document processor 55 is monitored by the monitor 101 to have the test structured document 50. From the test structured document 50, the structured document derivation system 34 generates derived structured documents. With the derived structured documents, the testing device 51 tests the structured document processor 55. The test analyzer 52 distinguishes between acceptable derived patterns and unacceptable derived patterns. The test analyzer 52 analyzes a structured document with respect to a structured document processing request in run time. When the structured document matches the unacceptable derived pattern, the test analyzer replaces the document with one in the acceptable derived pattern. As a result, derived structured documents of various representations having the same contents as an original structured document can be generated, and a structured document processing system can be easily tested. Further, a system for avoiding the vulnerability of structured document processing can be built.

Next, a description will be given of the operation of the sixth embodiment with reference to a flowchart of FIG. 10. The monitor 101 monitors a structured document being a processing request from the structured document processing generator 100 to the structured document processor 55 to generate the test structured document 50 (step 110). By using the test structured document 50 and the structured document type defining document 40 as an option, the structured document derivation system 34 generates derivatives (step 111). The testing device 51 selects one of the derivatives to be tested by the structured document processor 55 (step 112). Next, the testing device 51 determines whether or not all the derived documents are tested. If there is any derivative left untested, the step 112 is repeated (step 113). When all the derivatives are tested, the test analyzer 52 analyzes the test results to round it up (step 114). The test results are output (step 115).

In the sixth embodiment, a processing request from the structured document processing generator 100 to the structured document processor 55 is monitored to have the test structured document 50 which is to be used as an input to the structured document test system 54. Therefore, the structured document processor 55 can be tested precisely.

A Detailed Description will be Given of the Seventh Embodiment

FIG. 11 is a block diagram showing the structure of a structured document vulnerability avoidance system according to the seventh embodiment. Referring to FIG. 11, a structured document vulnerability avoidance system 123 comprises a pattern sensing device 121 and a pattern replacement device 122. The pattern sensing device 121 receives a processing request from a structured document processing request device 120, inputs the vulnerability pattern 70 and the structured document type defining document 40 as an option to detect the pattern from the processing request. The pattern replacement device 122 replaces the structured document that matches the vulnerability pattern 70 in the pattern sensing device 121.

A processing request from the structured document processing request device 120 is sent to the pattern sensing device 121. The pattern sensing device 121 inevitably waits an input of a vulnerability pattern and optionally waits an input of the structured document type defining document 40. The pattern sensing device 121 detects whether or not a document as the processing request include the vulnerability pattern. In the case that the document includes the vulnerability pattern, the document is supplied to the pattern replacement device 122 to be converted to a structured document in a pattern that does not match the vulnerability pattern. The pattern replacement device 122 sends the document not including the vulnerability pattern to the structured document processor 55.

Figure 12:
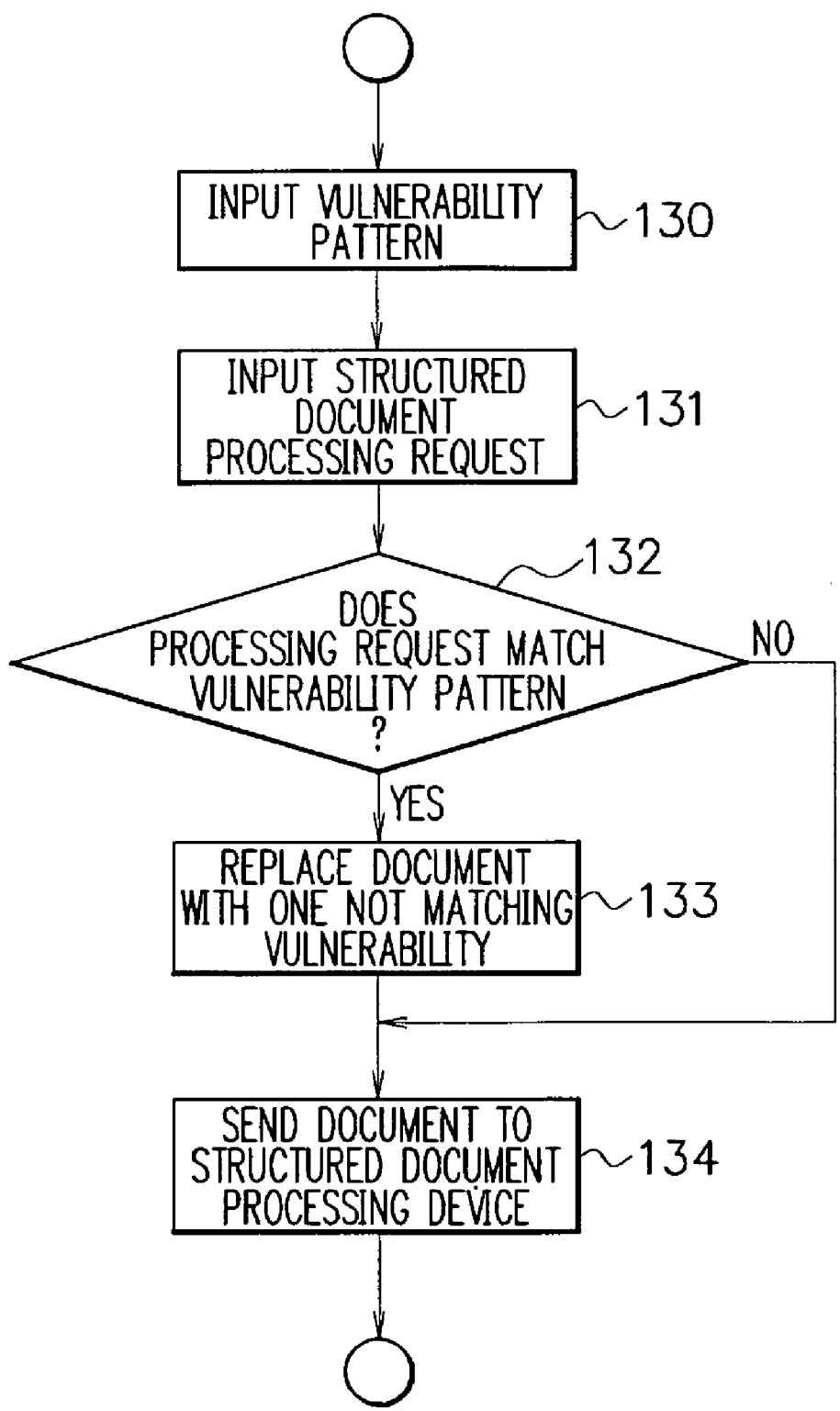
FIG. 12 is a flowchart showing the operation of the structured document vulnerability avoidance system of the seventh embodiment.

A detailed description will be given of the operation of the seventh embodiment with reference to a flowchart of FIG. 12. A vulnerability pattern is input to the pattern sensing device 121 (step 130). The structured document type defining document 40 is input to the pattern sensing device 121 (not shown). A structured document processing request is sent from the structured document processing request device 120 (step 131). The pattern sensing device 121 detects whether or not a document received as the processing request includes a pattern that matches the vulnerability pattern 70 (step 132). When the processing request includes a pattern that matches the vulnerability pattern 70, the pattern replacement device 122 replaces it with the pattern that does not match the vulnerability pattern 70 (step 133). The structured document thus replaced is sent to the structured document processor 55. When the document input as the processing request does not include a pattern that matches the vulnerability pattern 70, the document is directly sent to the structured document processor 55 (step 134).

In the seventh embodiment, by using the vulnerability pattern 70, the pattern replacement device 122 can convert a processing request from the structured document processing request device 120 to the structured document processor 55 to a structured document that does not match the vulnerability pattern 70 before sending it to the structured document processor 55. Thus, such structured document which the structured document processor 55 cannot process can be avoided.

A Detailed Description will be Given of the Eighth Embodiment

Figure 13:
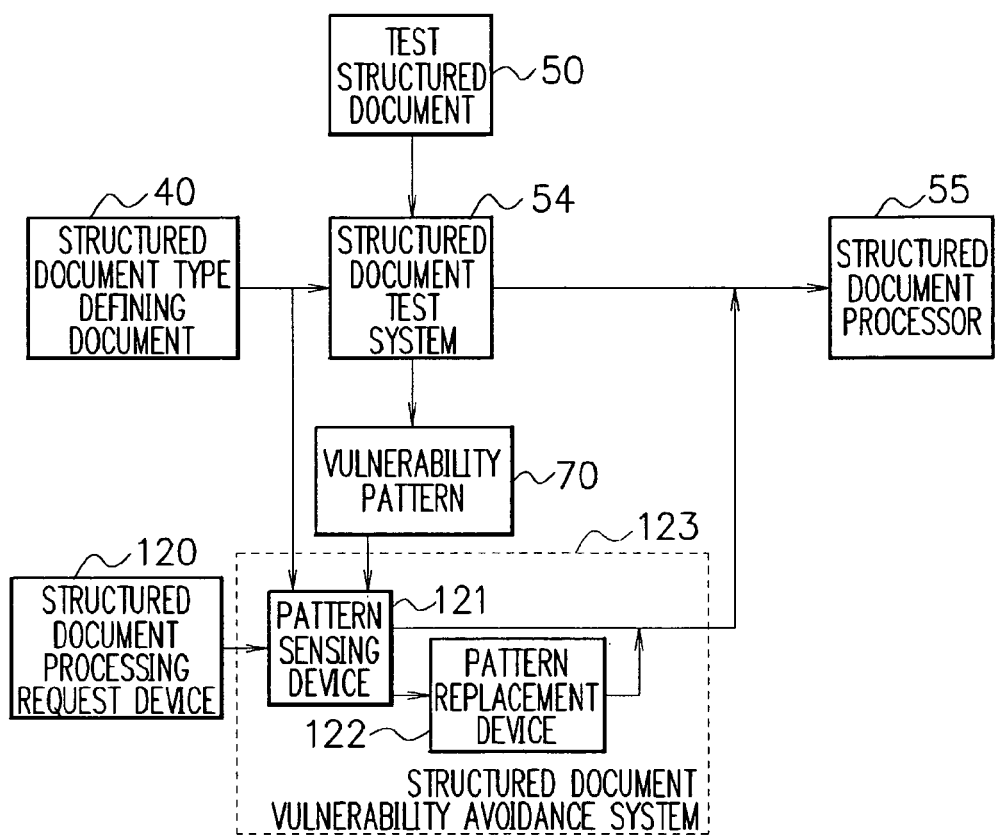
FIG. 13 is a block diagram illustrating the eighth embodiment of the present invention.

Referring to FIG. 13 illustrating the eighth embodiment, there are shown the structured document test system 54 inputting the test structured document 50 and the structured document type defining document 40 and connected to the structured document processor 55, and the structured document vulnerability avoidance system 123. The structured document vulnerability avoidance system 123 comprises the pattern sensing device 121 and the pattern replacement device 122. The pattern sensing device 121 inputs the vulnerability pattern 70 from the structured document test system 54 and the structured document type defining document 40. Further, having received a processing request from the structured document processing request device 120, the pattern sensing device 121 detects the pattern of the processing request device 120. The pattern replacement device 122 replaces the structured document determined to match the vulnerability pattern 70 in the pattern sensing device 121.

On receipt of inputs of the test structured document 50 and the structured document type defining document 40 as an option, the structured document test system 54 tests the structured document processor 55 to generate the vulnerability pattern 70. The pattern sensing device 121 inputs the vulnerability pattern 70 and the structured document type defining document 40 as an option, and further receives a structured document as a processing request from the structured document processing request device 120 to detect whether or not the vulnerability pattern 70 is included in the document as the processing request. In the case where the vulnerability pattern 70 is included, the document is fed to the pattern replacement device 122 to be converted to the structured document that does not match the vulnerability pattern 70. Thereby, the document that does not match the vulnerability pattern 70 is sent to the structured document processor 55.

In this embodiment, by using the vulnerability pattern 70 generated by the structured document test system 54, a processing request from the structured document processing request device 120 to the structured document processor 55 can be converted to the structured document not including the vulnerability pattern 70 to be sent to the structured document processor 55. Therefore, it is possible to avoid the structured document incapable of being processed by the structured document processor 55.

A Detailed Description will be Given of the Ninth Embodiment

Figure 14:
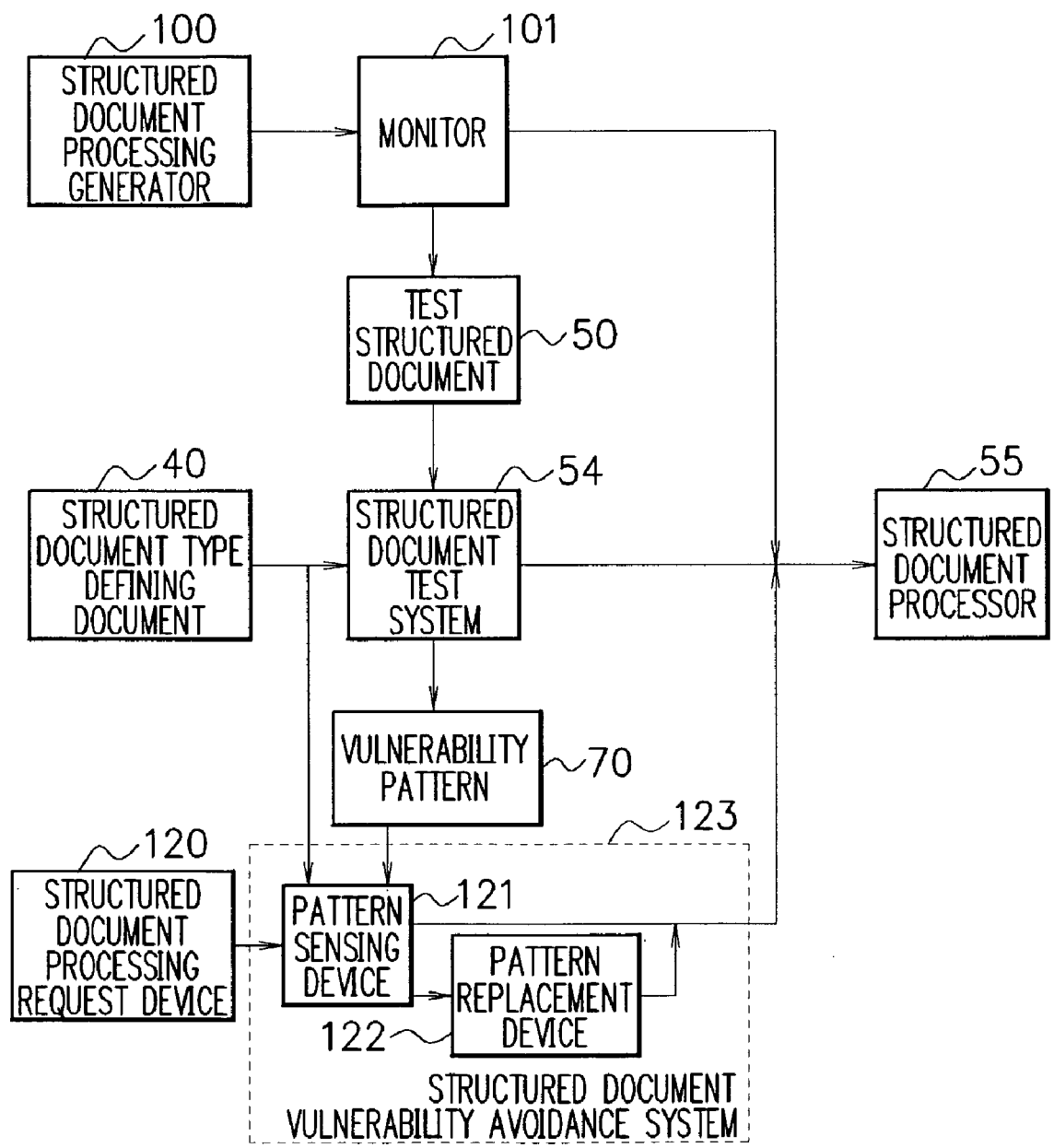
FIG. 14 is a block diagram illustrating the ninth embodiment of the present invention.

Referring to FIG. 14 illustrating the ninth embodiment, there are shown the monitor 101 for monitoring processing requests from the structured document processing generator 100 to the structured document processor 55, the structured document test system 54 for inputting the test structured document 50 monitored by the monitor 101 and the structured document type defining document 40 connected to the structured document processor 55, and the structured document vulnerability avoidance system 123. The structured document vulnerability avoidance system 123 comprises the pattern sensing device 121 and the pattern replacement system 122. The pattern sensing device 121 inputs the vulnerability pattern 70 from the structured document test system 54 and the structured document type defining document 40. Further, having received a processing request from the structured document processing request device 120, the pattern sensing device 121 detects the pattern of the processing request. The pattern replacement device 122 replaces the structured document determined to match the vulnerability pattern 70 in the pattern sensing device 121.

The structured document processing generator 100 makes a processing request to the structured document processor 55. The monitor 101 monitors the processing request to make the test structured document 50. The structured document test system 54 which has accepted inputs of the test structured document 50 and the structured document type defining document 40 as an option tests the structured document processor 55 to generate the vulnerability pattern 70. The pattern sensing device 121 inputs the vulnerability pattern 70 and the structured document type defining document 40 as an option. Further, having received a structured document as the processing request from the structured document processing request device 120, the pattern sensing device 121 detects whether or not the document as processing request includes the vulnerability pattern 70. In the case where the vulnerability pattern 70 is included, the document is fed to the pattern replacement device 122 to be converted to the structured document not matching the vulnerability pattern 70. Thereby, the document that does not match the vulnerability pattern 70 is sent to the structured document processor 55.

In this embodiment, a processing request from the structured document processing generator 100 to the structured document processor 55 is monitored and the monitored data is input to the structured document test system 54 as the test structured document 50 for generating the vulnerability pattern 70. Then, the processing request from the structured document processing request device 120 to the structured document processor 55 is converted to the structured document not matching the vulnerability pattern 70 before being sent to the structured document processor 55. Thus, it is possible to avoid the structured document incapable of being processed by the structured document processor 55.

A Detailed Description will be Given of the Tenth Embodiment

Figure 16:
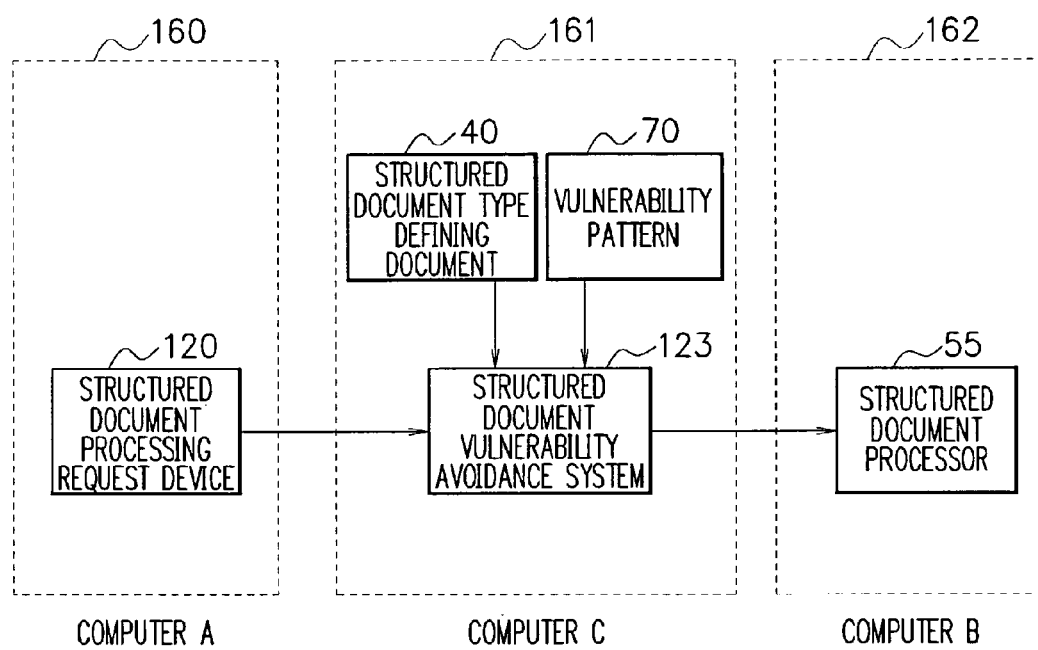
FIG. 16 is a block diagram showing the structure of another structured document processor quality improvement system according to the tenth embodiment.

FIGS. 15 and 16 are diagrams showing examples of structure of a structured document processor quality improvement system according to the tenth embodiment. In FIG. 15, the structured document type defining document 40, the vulnerability pattern 70, the structured document vulnerability avoidance system 123, and the structured document processor 55 are allocated in a computer B 151. In FIG. 16, the structured document type defining document 40, the vulnerability pattern 70, and the structured document vulnerability avoidance system 123 are allocated in a computer C 161, and the structured document processor 55 is allocated in another computer B 162.

In the structure of FIG. 15, the structured document processor 55 cannot be seen from the outside, and all processing requests from the outside are received at the structured document vulnerability avoidance system 123. Thereby, the structured document processor in the computer B 151 can process a structured document as a processing request in any representation sent from the structured document processing request device 120 in a computer A 150. On the other hand, in the structure of FIG. 16, when the structured document processor 55 allocated in the computer B 162 is directly called, some structured documents as processing requests cannot be accepted. The unaccepted processing request can be processed by employing the service of the structured document vulnerability avoidance system 123 allocated in another computer C 161.

In this embodiment, there is provided a method in which the structured document vulnerability avoidance system 123 and the structured document processor 55 are implemented in one computer to make one high-quality processing system, and another method in which the structured document vulnerability avoidance system 123 and the structured document processor 55 are allocated in separate computers to provide the vulnerability avoidance service from the outside. That makes it possible to use these systems depending on the object.

Next, a description will be given of concrete examples of caring out the invention in practice.

FIG. 17 shows as concrete examples of structured documents, four XML (extensible Markup Language) documents. These four XML documents of different representations with respect to the namespaces has the same contents. In an example 170, while the namespace URI (Uniform Resource Identifiers) is "http://nec.com/name", as a prefix, "prn"is set to express the element names such as "name", "first" and "last" as "prn:name", "prn:first", and "prn:last". In an example 171, in the namespace URI, different prefixes, "prn", "prn1" and "prn2", are set for respective elements to express the respective elements as "prn:name", "prn1:first" and "prn2:last". In an example 172, the namespace URL is set to a designated address and the elements are expressed as "name", "first"and "last" without any prefix. In an example 173, as with the example 170, "prn" is set as the prefix of the namespace URI. However, differently from the example 170, a plurality of spaces are input before the prefix.

While, with reference to FIG. 17, differences of the prefix and input spaces with respect to the namespace are described above, there are other derived structured documents of different representations having the same contents. For example, derivative representations can vary depending on whether the attribute value is enclosed in single quotes or double quotes, or a character code is of UTF (Unicode Transformation Format)-8 or UTF-16.

In the structured document derivation system 34 in FIG. 3, the structured document 30 in a single representation is input to generate a variety of derivatives. For example, when the structured document 30 of the example 170 is input, it is fed to the structured document inputting section 31 to be converted to the system's internal representation. Then, the structured document derivative generator 32 generates derivatives. The derivation functions 33 are provided as information on what derived documents should be generated. The derivation functions 33 include, for example, derivation method for putting the prefix to the namespace URI to automatically generate structured documents such as the examples 171 to 173. Thus, the structured documents of different representations having the same contents 35 are output.

Next, a description will be given of a concrete example of the operation of the second embodiment.

The examples of the structured documents shown in FIG. 17 are of the uniform contents, and the structured document type defining document 180 used in common among them is shown in FIG. 18. When derived structured documents are generated by using the structured document type defining document 180, the structured document derivation system 34 in FIG. 5 is applied. The structured document type defining document 180, as the structured document type defining document 40 is accepted by the structured document type defining document inputting section 41, and provides supplementary information to generate derivatives by the structured document derivative generator 32. For example, with the information on data type of elements, when it is an integral type element, "+1" and "1" are equivalent, and therefore it is possible to generate a derivative by putting "+" to an unsigned integer.

Next, a description will be given of a concrete example of the operation of the fifth embodiment.

In FIG. 7, for example, as the test structured document 50, the example 170 is input, and as a structured document type defining document 40, the example 180 is input. As a result, the structured document derivation system 34 generates derivatives such as the examples 171 to 173. The testing device 51 tests the structured document processor 55 with these derived structured documents. For example, the structured document processor 55 capable of receiving SOAP (Simple Object Access Protocol) issues SOAP message calls each having the element "name" as an argument as in the examples 170 to 173. Whether or not the respective message calls are properly processed is recorded, and from the test analyzer 52 the vulnerability pattern 70 and the test result 53 are output. FIG. 19 shows an example of the vulnerability pattern 70 as an example 80. In this example, a derivation type is described at a "target" attribute of a "feature" element, and an individual keyword for derivation is described at a "function" element of an "option" element. Whether or not the structured document processor 55 can accept a document or a representation is expressed at a "result" element of an "option" element with "valid" or "invalid". For example, for the derivation type of a "character-set", the derivation form of a "utf-8" is "valid" and passes a test. On the contrary, the derivation form of a "utf-16" is "invalid".

Next, a description will be given of a concrete example of the operation of the eighth embodiment.

Applying the example 80 of a vulnerability pattern in FIG. 19 to FIG. 11, when a request from the structured document processing request device 120 is sent to the structured document processor 55, an unacceptable structured document can be converted to an acceptable one. For example, with the example 80, a document of "utf-8" can be directly sent to the structured document processor 55, while a document of "utf-16" is converted to that of "utf-8" at the pattern replacement device 122 so as to be acceptable to the processor 55.

According to the present invention, for a system in which processing is performed by exchanging structured documents such as XML or SGML (Standard Generalized Markup Language) between computers, test cases of XML or SGML can be produced in large quantities. Further, for a system in which a processing is performed by exchanging structured documents such as XML or SGML between computers, a processor can be tested with a variety of derivatives. Furthermore, for a system in which a processing is performed by exchanging structured documents such as XML or SGML between computers, vulnerability of the processing of a processor can be avoided.

As set forth hereinabove, according to the present invention, a structured document derivation system includes a structured document derivative generator for generating derivatives of an input structured document with derivation functions having information on a variation of representations of the structured document. Thus, the structured document derivation system operates so that a plurality of derivatives having the same contents with a variety of representations can be generated by inputting only a structured document without any structured document type defining document.

Further, by the structured document derivation system, a plurality of derivatives can be generated to input to a structured document processor. Thus, a plurality of derivatives having the same contents with a variety of representations can be tested with the structured document processor and the vulnerability of the structured document processor can be effectively extracted during the test.

Moreover, by a structured document test system, the derived structured documents can be tested beforehand to memorize a vulnerability pattern as the results of the test, and when a structured document of the vulnerability pattern is input, the structured document is converted to a derivative in another pattern avoiding the vulnerability for being input to the structured document processor. Thus, it is possible to avoid the vulnerability of the structured document processor for processing a structured document in a pattern unacceptable to the structured document processor in those of various representations input to the processor.

Furthermore, inputs and outputs of a structured document vulnerability avoidance system are structured documents having the same contents, and the avoidance system performs the vulnerability avoidance operation in an intermediate node as an independent system without changing the operation of a structured document processing system. Thus, a quality improvement system can be achieved in an external device because the structured document vulnerability can be avoided in an intermediate node other than the structured document processor.

While preferred embodiments of the invention have been described using specific terms, the description has been for illustrative purpose only, and it is to be understood that changes and variations may be made without departing from the spirit or scope of the following claims.

What is claimed is:

1. A structured document test method comprising:
    testing whether or not a system can accept structured documents of various representations having the same contents derived from a structured document where the derived structured documents are generated by:
        registering derivation functions capable of converting representation without changing the contents of a structured document;
        accepting an input of a structured document; and
        generating a plurality of derived structured documents based on the registered derivation functions in various representations without changing the content of the structured document;

analyzing the results of the test; and outputting the results of the analysis as test results.

2. The structured document test method claimed in claim 1, wherein the test results include information on one or more vulnerability patterns which cannot be processed by the structured document processor.

3. The test method claimed in claim 1, further comprising displaying the test results.

4. The structured document test method claimed in claim 1, further comprising:

monitoring processing requests from a structured document processing generator to the structured document processor; and accepting a structured document obtained through the monitoring as an input.

5. A structured document vulnerability avoiding method comprising:

registering one or more vulnerability patterns;

inputting a structured document processing request to a structured document processor;

determining whether or not the structured document processing request includes the processing of a structured document in a pattern that matches the vulnerability pattern registered; and when the structured document processing request includes a structured document that matches the vulnerability pattern, replacing the representation of the structured document with one that does not match the vulnerability pattern.

6. The structured document vulnerability avoiding method claimed in claim 5, further comprising:

testing the structured document processor by a structured document test method; and registering the vulnerability pattern included in the results of the structured document test method which cannot be processed by the structured document processor.

7. The structured document vulnerability avoiding method claimed in claim 5, further comprising:

monitoring the structured document processing request to a structured document processor;

testing the structured document processor by using the results of the monitoring according to a structured document test method; and registering the vulnerability pattern included in the results of the structured document test method which cannot be processed by the structured document processor.

8. A computer program product comprising:

software instructions for enabling a computer to perform predetermined operations; and a computer readable medium bearing the software instructions;

the predetermined operations comprising:

registering derivation functions capable of converting representation without changing the contents of a structured document;

accepting an input of a structured document;

generating a plurality of derived structured documents based on the registered derivation functions in different representations without changing the contents of the structured document;

testing whether or not the derived structured documents generated are accepted by the computer;

analyzing the results of the test; and outputting the results of the analysis as test results.

9. The computer program product claimed in claim 8, wherein the test results include information on one or more vulnerability patterns, which cannot be processed by the structured document processor.

10. The computer program product claimed in claim 8, wherein the predetermined operations further comprise displaying the test results.

11. The computer program product claimed in claim 8, wherein the predetermined operations further comprise:

monitoring a processing request from a structured document processing generator to the structured document processor; and inputting a structured document obtained through the monitoring.

* * * * *